United States Patent
Fan et al.

(10) Patent No.: US 9,210,700 B2
(45) Date of Patent: Dec. 8, 2015

(54) SIMULTANEOUS TRANSMISSION OF ACKNOWLEDGEMENT, CHANNEL QUALITY INDICATOR AND SCHEDULING REQUEST

(71) Applicant: QUALCOMM Incorporated, San Diego, CA (US)

(72) Inventors: Zhifei Fan, San Diego, CA (US); Hao Xu, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/489,277

(22) Filed: Sep. 17, 2014

(65) Prior Publication Data

US 2015/0110043 A1    Apr. 23, 2015

Related U.S. Application Data

(63) Continuation of application No. 12/364,405, filed on Feb. 2, 2009, now Pat. No. 8,848,620.

(60) Provisional application No. 61/026,091, filed on Feb. 4, 2008.

(51) Int. Cl.
 H04W 72/04 (2009.01)
 H04W 72/12 (2009.01)
 H04L 5/00 (2006.01)

(52) U.S. Cl.
 CPC ......... *H04W 72/0413* (2013.01); *H04L 5/0053* (2013.01); *H04L 5/0055* (2013.01); *H04L 5/0057* (2013.01); *H04W 72/1268* (2013.01)

(58) Field of Classification Search
 CPC ............ H04W 72/1268; H04L 5/0053; H04L 5/0055; H04L 5/0057
 See application file for complete search history.

(56) References Cited

U.S. PATENT DOCUMENTS 6,188,717 B1    2/2001    Kaiser et al.
7,072,663 B2    7/2006    Ramos et al.
(Continued)

FOREIGN PATENT DOCUMENTS

CN    101039160 A    9/2007
EP    1761080 A1    3/2007
(Continued)

OTHER PUBLICATIONS

3GPP TSG RAN WG1 #49bis, R1-072748,Jun. 25, 2007,URL, http://www.3gpp.org/ftp/tsg_ran/WG1_RL1/TSGR1_49b/Docs/R1-072748.zip.
(Continued)

*Primary Examiner* — Jianye Wu
(74) *Attorney, Agent, or Firm* — Paul Kuo

(57) ABSTRACT

Systems and methodologies are described that facilitate simultaneous transmission of control information in a single sub-frame. For instance, simultaneous transmission can maintain single carrier waveforms for a control channel even when a plurality of information types is scheduled in concurrently. Channel quality indicators, scheduling requests and acknowledgement messages can be jointly coded. In addition, reference symbols in a sub-frame can be modulated to indicate values associated with a scheduling request or an acknowledgement message. Moreover, in situations where channel quality indicators, scheduling requests and or acknowledgement messages are simultaneously scheduled, one or more can be dropped. Further, a single carrier constraint can be relaxed to enable simultaneous transmission of information in the sub-frame at different frequencies.

22 Claims, 12 Drawing Sheets

(56) References Cited

U.S. PATENT DOCUMENTS

| | | | |
|---|---|---|---|
| 7,155,236 | B2 | 12/2006 | Chen et al. |
| 7,315,527 | B2 | 1/2008 | Wei et al. |
| 2007/0133458 | A1 | 6/2007 | Chandra et al. |
| 2007/0183384 | A1 | 8/2007 | Kwak et al. |
| 2007/0201397 | A1* | 8/2007 | Zhang ............... 370/329 |
| 2008/0043708 | A1* | 2/2008 | Muharemovic et al. ...... 370/348 |
| 2008/0267318 | A1* | 10/2008 | Ihm et al. ............... 375/299 |
| 2009/0046641 | A1 | 2/2009 | Wang et al. |
| 2009/0046649 | A1 | 2/2009 | Gao et al. |
| 2009/0052378 | A1* | 2/2009 | Aghili et al. ............... 370/328 |
| 2009/0109917 | A1 | 4/2009 | Pajukoski et al. |
| 2009/0196247 | A1 | 8/2009 | Fan et al. |

FOREIGN PATENT DOCUMENTS

| | | |
|---|---|---|
| JP | 2009522911 A | 6/2009 |
| RU | 2005129079 A | 2/2006 |
| RU | 2277762 C2 | 6/2006 |
| RU | 2006106720 A | 8/2006 |
| WO | 0232179 A1 | 4/2002 |
| WO | 2004075468 A2 | 9/2004 |
| WO | 2005018270 | 2/2005 |
| WO | 2005099294 A1 | 10/2005 |
| WO | 2007078146 A1 | 7/2007 |
| WO | 2007081564 A2 | 7/2007 |

OTHER PUBLICATIONS

3GPP TSG RAN WG1 #50bis, R1-074205,Oct. 8, 2007,URL, http://www.3gpp.org/ftp/tsg_ran/WG1_RL1/TSGR1_50b/Docs/R1-074205.zip.

3GPP TSG RAN WG1 LTE Ad Hoc, R1-061672: Coding Scheme of L1/L2 Control Channel for E-UTRA Downlink, NTT DoCoMo et al., Cannes, France, Jun. 27-30, 2006.

3GPP TSG RAN1 #51, R1-074962,Nov. 5, 2007,URL, http://www.3gpp.org/ftp/tsg_ran/WG1_RL1/TSGR1_51/Docs/R1-074962.zip.

3GPP TSG RAN1 #51-bis, R1-080479,Jan. 14, 2008,URL, http://www.3gpp.org/ftp/tsg_ran/WG1_RL1/TSGR1_51b/Docs/R1-080479.zip.

3GPP TSG-RAN WG1 #50bis, R1-074372,Oct. 8, 2007,URL, http://www.3gpp.org/ftp/tsg_ran/WG1_RL1/TSGR1_50b/Docs/R1-074372.zip.

3GPP TSG-RAN WG1#50bis, R1-074272,Oct. 8, 2007,URL, http://www.3gpp.org/ftp/tsg_ran/WG1_RL1/TSGR1_50b/Docs/R1-074272.zip.

IEEE Standard 802.16, IEEE Standard for Local and Metropolitan Area Networks, Part 16: Air Interface for Fixed Broadband Wireless Access Systems, pp. 1-895, Oct. 1, 2004.

International Search Report and Written Opinion—PCT/US2009/032968—ISA/EPO—Sep. 25, 2009.

Motorola: "Multiplexing of UL L1/L2 control signals in the absence of data" 3GPP Draft; R1-072185 UL_CCH_Nodata, 3rd Generation Partnership Project (3GPP), Mobile Competence Centre ; 650, Route Des Lucioles ; F-06921 Sophia-Antipolis Cedex; France, vol. RAN WG1, No. Kobe, Japan; 20070507, May 2, 2007, XP050105925 sections 2 and 3.

Nokia, et al., "Data-non-associated control signal transmission without UL data" 3GPP Draft; R1-071676, 3rd Generation Partnership Project (3GPP), Mobile Competence Centre ; 650, Route Des Lucioles ; F-06921 Sophia-Antipolis Cedex ; France, vol. RAN WG1, No. St. Julian; 20070326, Mar. 21, 2007, XP050105599 section 3 and 4.

NTT DoCoMo: "Physical channels and Multiplexing in Evolved UTRA Downlink," 3GPP Draft, R1-050590_Physical Channels and Multiplexing in DL, 3rd Generation Partnership Project (3GPP), Mobile Competence. Centre; 650, Route Des Lucioles; F-06921 Sophia-Antipolis Cedex; France, vol. RAN WG1, No. Sophia Antipolis, France; 20050616, Jun. 16, 2005, XP050111408 [retrievd on Jun. 16, 2005] p. 4-p. 6; figure 3, p. 16-p. 17.

Panasonic, "Indication of combination between L1/L2 control signaling and uplink data", TSG-RAN WG1 Meeting#44bis, R1-060793, Athens, Greece, Mar. 27-31, 2006.

Qualcomm Europe: Proposed Structure for UL ACK and CQI 3GPP Draft; R1-070437, 3rd Generation Partnership Project (3GPP), Mobile Competence Centre; 650, Route Des Lucioles; F-06921 Sophia-Antipolis Cedex; France, vol. tsg_ranWGI_RLITSGRI_47bisDocs, No. Sorrento, Italy; 20070115, Jan. 9, 2007, XP050104468 paragraph [0001]].

Taiwan Search Report—TW098103597—TIPO—May 14, 2013.

* cited by examiner

SIMULTANEOUS TRANSMISSION OF ACKNOWLEDGEMENT, CHANNEL QUALITY INDICATOR AND SCHEDULING REQUEST

CROSS-REFERENCE TO RELATED APPLICATIONS

The present application for patent is a continuation application of U.S. application Ser. No. 12/364,405, filed Feb. 2, 2009 (U.S. Pat. No. 8,848,620 to be issued Sep. 30, 2014) which claims priority to U.S. Provisional Patent application Ser. No. 61/026,091 entitled "SIMULTANEOUS TRANSMISSION OF ACK, CQI AND SCHEDULING REQUEST IN COMMUNICATION SYSTEMS" which was filed Feb. 4, 2008. The entirety of the aforementioned application is herein incorporated by reference.

BACKGROUND

I. Field

The following description relates generally to wireless communications, and more particularly to employing reference symbol modulation and/or joint coding to facilitate transmission of acknowledgment messages, channel quality indicators and scheduling requests in a sub-frame.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (CDMA) systems, orthogonal frequency division multiple access (OFDMA) systems, and the like. Additionally, the systems can conform to specifications such as third generation partnership project (3GPP), 3GPP2, 3GPP long-term evolution (LTE), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

MIMO systems commonly employ multiple ($N_T$) transmit antennas and multiple ($N_R$) receive antennas for data transmission. A MIMO channel formed by the $N_T$ transmit and $N_R$ receive antennas may be decomposed into $N_S$ independent channels, which may be referred to as spatial channels, where $N_S \leq \{N_T, N_R\}$. Each of the $N_S$ independent channels corresponds to a dimension. Moreover, MIMO systems may provide improved performance (e.g., increased spectral efficiency, higher throughput and/or greater reliability) if the additional dimensionalities created by the multiple transmit and received antennas are utilized.

In LTE-based systems, for example, uplink communications employ single carrier frequency division multiplex access (SC-FDMA). Control information, such as scheduling requests, channel quality indicators, and acknowledgement messages, cannot typically be transmitted in a single sub-frame without violating certain single carrier characteristics. However, situations can arise in which collisions (e.g., a need to transmit simultaneously) are unavoidable.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described related to simultaneous transmission of control information in a single sub-frame. For instance, simultaneous transmission can maintain single carrier waveforms for a control channel even when a plurality of information types is scheduled in concurrently. Channel quality indicators, scheduling requests and acknowledgement messages can be jointly coded. In addition, reference symbols in a sub-frame can be modulated to indicate values associated with a scheduling request or an acknowledgement message. Moreover, in situations where channel quality indicators, scheduling requests and or acknowledgement messages are simultaneously scheduled, one or more can be dropped.

According to related aspects, a method that facilitates simultaneous transmission of control information is provided. The method can comprise identifying a sub-frame in which two or more types of control information are scheduled. The identification can comprise detection of at least one of: a scheduling request and an acknowledgement message scheduled in the sub-frame, a channel quality indicator and a scheduling request scheduled in the sub-frame, or an acknowledgement message, a scheduling request and a channel quality indicator scheduled in the sub-frame. The method can include incorporating the two or more types of control information into the sub-frame via at least one of: relaxing a single carrier constraint to enable simultaneous transmission of two or more types of control information; joint coding of the two or more types of control information; or modulating a reference symbol in the sub-frame to indicate at least one of the two or more types of control information.

Another aspect relates to an apparatus that enables concurrent transmission of control information in a single sub-frame. The apparatus can include a collision detector that identifies when two or more types of control information are scheduled in a sub-frame. The collision detector identifies at least one of: coexistence of an acknowledgement message and a scheduling request in the sub-frame, coexistence of a scheduling request and a channel quality indicator, or coexistence of a channel quality indicator, a scheduling request and a channel quality indicator. The apparatus can also comprise a joint encoder that codes at least two or more types of control information together into an aggregate. In addition, the apparatus can include a reference symbol modulator that facilitates modulation of reference symbols in sub-frame to include one type of control information.

Yet another aspect relates to a wireless communications apparatus that facilitates simultaneously transmitting control information on an uplink control channel. The wireless communications apparatus includes means for detecting at least one of: two or more types of control information scheduled in a single sub-frame. The means for detecting identifies at least one of: a scheduling request scheduled concurrently with an acknowledgement message, a channel quality indicator scheduled concurrently with a scheduling request, or an acknowledgement message concurrently scheduled with a scheduling request and a channel quality indicator. The wireless communications apparatus can also comprise means for jointly coding two or more types of control information into the sub-frame. Further, the wireless communications apparatus can include means for modulating reference symbols in the sub-frame to indicate one type of control information. In addition, the wireless communications apparatus can comprise means for transmitting the two or more types of control information in the single sub-frame on the uplink control channel.

Still another aspect relates to a computer program product, which can have a computer-readable medium. The computer-readable medium can include code for causing at least one computer to identify a sub-frame in which two or more types of control information are scheduled. The identification comprises detection of at least one of: a scheduling request and an acknowledgement message scheduled in the sub-frame, a channel quality indicator and a scheduling request scheduled in the sub-frame, or an acknowledgement message, a scheduling request and a channel quality indicator scheduled in the sub-frame. Further, the computer-readable medium can comprise code for causing at the least one computer jointly encode of the two or more types of control information. In addition, the computer-readable medium can include code for causing the at least one computer to modulate a reference symbol in the sub-frame to indicate one of the two or more types of control information.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
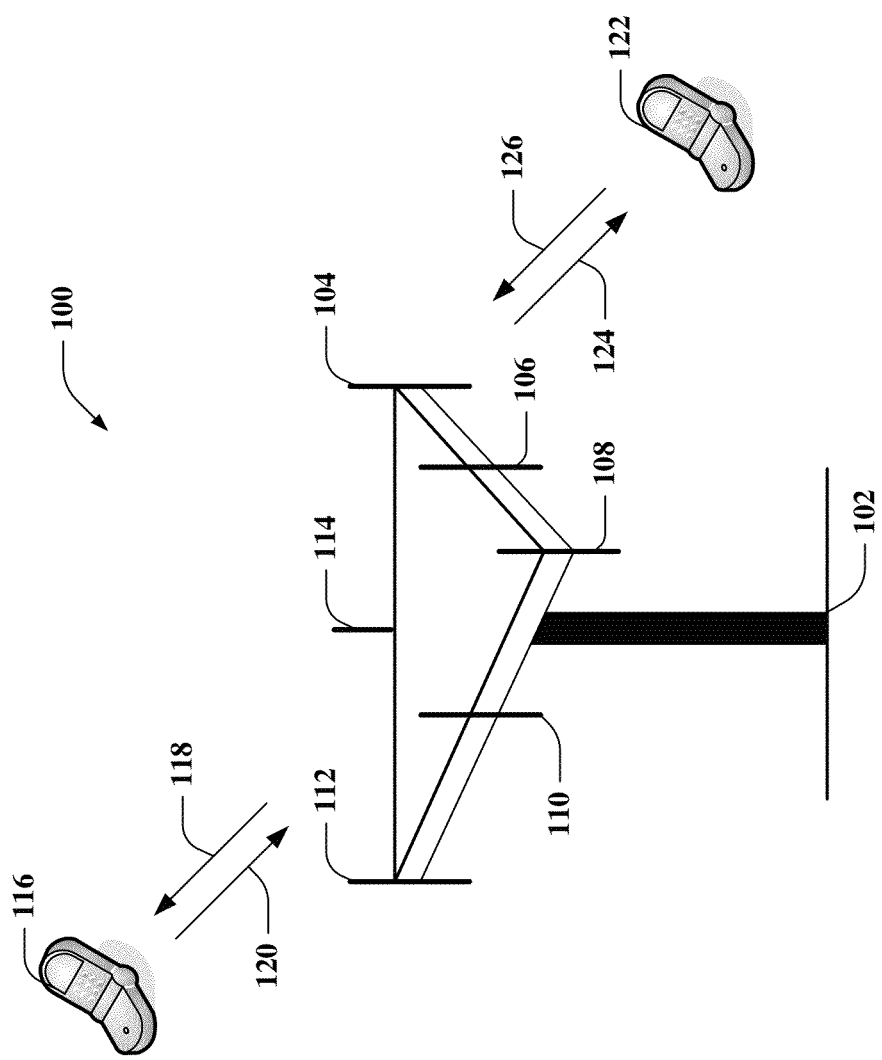
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, evolved Node B (eNode B or eNB), base transceiver station (BTS) or some other terminology.

Moreover, various aspects or features described herein can be implemented as a method, apparatus, or article of manufacture (e.g., computer program product) using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein may be used for various wireless communication systems such as code division multiple access (CDMA), time division multiple access (TDMA), frequency division multiple access (FDMA), orthogonal frequency division multiple access (OFDMA), single carrier frequency domain multiplexing (SC-FDMA) and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. This can be provided by using a precoder to steer signals in desired directions, for example. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices. Moreover, mobile devices 116 and 122 can communicate directly with one another using a peer-to-peer or ad hoc technology in one example. According to an example, system 100 can be a multiple-input multiple-output (MIMO) communication system. Further, system 100 can utilize substantially any type of duplexing technique to divide communication channels (e.g., forward link, reverse link, . . . ) such as FDD, TDD, and the like.

Pursuant to an illustration, mobile devices 116 and 122 can employ an uplink control channel to transmit a variety of report information to base station 102. Pursuant to an illustration, a physical uplink control channel (PUCCH) in Long Term Evolution (LTE) based systems can be utilized. Mobile devices 116 and 122 can report a channel quality indicator (CQI) that can specify a signal to interference over noise ratio per codeword on a downlink. In addition, mobile devices 116 and 122 can provide hybrid automatic repeat request (HARQ) indicators such as acknowledgement (ACK) messages and non-acknowledgement (NACK) messages. ACK and NACK messages inform base station 102 that packet transmitted on a downlink is received and successfully decoded or not received or decoded, respectively. Moreover, mobile device 116 and 122 can transmit scheduling requests (SR) to base station 102. A scheduling request is an indication that mobile device 116 and/or 122 desire to be scheduled (e.g., data is to ready for transmission on an uplink) or not to be scheduled (e.g., no data to transmit on the uplink). In one aspect, on-off keying can be based on HARQ configuration (e.g., design of ACK/NACK). For instance, a length seven sequence can be split into two orthogonal sequences of length three and length four. Further, to ensure compatibility with ACK/NACK transmissions from different mobile devices (e.g., between mobile device 116 and mobile device 122), different cyclic shifts and/or orthogonal covers can be assigned to scheduling requests and ACK/NACK messages.

Figure 2:
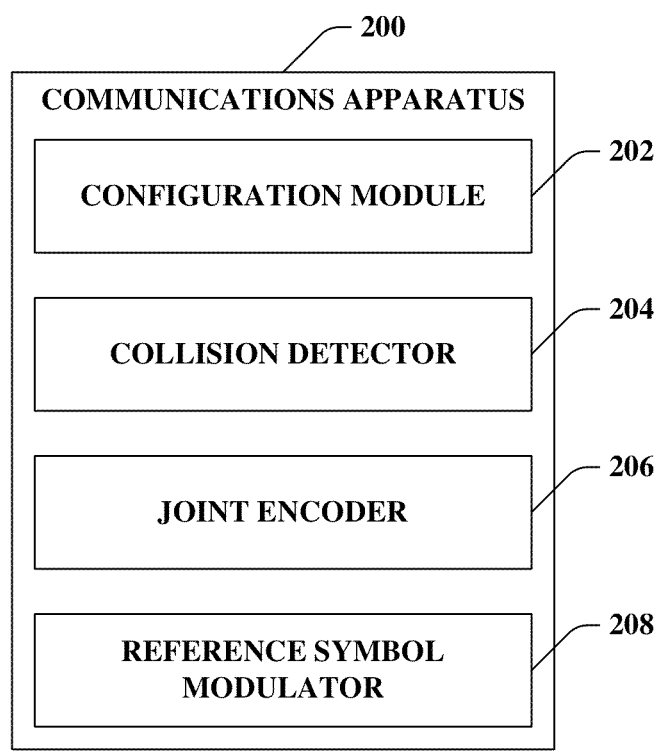
FIG. 2 is an illustration of an example communications apparatus for employment within a wireless communications environment in accordance with an aspect.

Turning to FIG. 2, illustrated is a communications apparatus 200 for employment within a wireless communications environment. The communications apparatus 200 can be a base station or a portion thereof, a mobile device or a portion thereof, or substantially any communications apparatus that receives data transmitted in a wireless communications environment. The communications apparatus 200 can include a configuration module 202 that facilitates configuration of the communications apparatus 200 to employ one of a variety of control channel formats to convey report information. Report information can include acknowledgement messages (e.g., ACK messages or NACK messages), channel quality indicators (CQI) and/or scheduling requests (SR). According to an aspect, such report information can be conveyed separately (e.g., at different times). For instance, scheduling requests and/or CQI are higher layer configured and can be scheduled to be reported at different times (e.g., in different sub-frames of the control channel). However, such information can be required to coexist in the same sub-frame. In addition, acknowledgement messages can require transmission at substantially any time. For example, an acknowledgment message needs to be sent to a transmitter whenever a packet is received or not received (e.g., not successfully decoded) to enable proper HARQ operations. Accordingly, instances can arise where CQI, scheduling requests and acknowledgement messages require simultaneous transmission in a single sub-frame.

In LTE-based systems, orthogonal frequency division multiple access (OFDMA) is employed on a downlink and single carrier frequency division multiple access (SC-FDMA) is utilized on an uplink. In one aspect, SC-FDMA is employed on the uplink due to its lower peak-to-average ratio (PAR) relative to OFDMA. To maintain a single carrier waveform on the uplink, the communications apparatus 200 can employ one of a plurality of control channel formats whenever two or more of acknowledgement messages, scheduling requests and CQI require transmission in a single sub-frame. The configuration module 202 facilitates configuration of the communications apparatus to employ one of those formats in accordance with configuration information. According to an aspect, the configuration information can be obtained from a base station (not shown) or other entity (e.g., core network entity) of a wireless communications system. Communications apparatus 200 also includes a collision detector 204 that identifies sub-frames in which at least two of a scheduling request, a channel quality indicator and an acknowledgement message are to be transmitted. In particular, the collision detector 204 identifies scenarios where a scheduling request and acknowledgement collide (e.g., scheduled to transmit simultaneously in a single sub-frame), where a scheduling request and CQI collide, and where a scheduling request, acknowledgement and CQI collide.

Communications apparatus 200 includes a joint encoder 206 that facilitates joint coding of two or more of acknowledgement messages, CQI and/or scheduling requests. For example, additional bits can be appended to a set of bits typically allocated for CQI reporting. The additional bits can be utilized to report acknowledgement messages and scheduling requests. The aggregate set of bits can be coded into a sub-frame through substantially similar mechanisms employed to encode CQI (e.g., (20, A) linear code where A is a number of bits). The encoded aggregate set of bits can be transmitted on a control channel and within a single sub-frame. In addition, the communications apparatus 200 includes a reference symbol modulator 208 that facilitates modulating reference symbols (RS) transmitted on the control channel. Pursuant to an illustration, for single-input antenna configurations (e.g., one codeword on downlink), a single bit can be utilized to convey acknowledgement messages. Accordingly, the reference symbol modulator 208 can modulate reference symbols with one value (e.g., 1) to indicate an ACK message and modulate reference symbols with another value (e.g., −1) to indicate a NACK message. For multiple-input, multiple-output (MIMO) antenna configurations, separate acknowledgement messages can be required for each stream or codeword. For instance, with two codewords, each codeword can independently require an ACK message or a NACK message resulting in four possible combinations. Thus, at least two bits of information are needed. The reference symbols modulator 206 can modulate reference symbols with additional values to accommodate the various states. For example, the reference symbol modulator 208 can modulate with a first value (e.g., 1) to indicate ACK on a first codeword, a second value (e.g., j) to indicate ACK on a second codeword, a third value (e.g., −j) to indicate NACK on the second codeword and a fourth value (e.g., −1) to indicate NACK on the first codeword.

As discussed supra, communications apparatus 200 can transmit scheduling requests, acknowledgement messages and channel quality indicators in a single sub-frame in order to maintain a single carrier waveform on an uplink control channel. In one example, communications apparatus 200 can transmit a scheduling request (SR) and an acknowledgement message simultaneously. According to an aspect, a constellation order of acknowledgement messages can be increased to accommodate SR. For instance, in single user multiple input multiple output (SU-MIMO) systems, a higher order modulation scheme can be utilized that enables transmission of three bits (e.g., two bits for acknowledgement and one bit for SR). For example, 8PSK (phase shift keying) can be employed to transmit three bits and, thus, jointly code a scheduling request and an acknowledgement message. In the case of a SIMO system, a higher order modulation scheme is not necessary as only a single bit is required to indicate an acknowledgement. The acknowledgement message and SR can be transmitted at resources assigned for scheduling requests while utilizing on/off detection for scheduling request transmission. In another aspect, the information can be transmitted at HARQ-assigned resources utilizing the higher order modulation scheme (e.g., 8PSK) described above. Further, the transmission scheme described in this example can be employed with both long and short cyclic prefix numerology.

In accordance with another example, communications apparatus 200 can transmit an SR and a CQI in a single sub-frame. For instance, an SR and CQI can be joint coded (e.g., by joint encoder 206). In addition, reference symbols can be modulated with an SR value (e.g., request to be scheduled or not to be scheduled). According to an aspect, an SR and CQI can be transmitted simultaneously at resources allocated for CQI reporting.

According to another example, communications apparatus 200 can transmit an acknowledgement message (ACK), an SR, and a CQI simultaneously in a single sub-frame. In one aspect, an SR, a CQI and an acknowledgement message can be joint coded together by joint encoder 206. According to another aspect, joint coding can be applied to an SR and a CQI, or an ACK and a CQI, and reference symbols can be modulated with the ACK or the SR, respectively. The transmission of the report information can occur at a slot assigned for CQI transmission.

It is to be appreciated that when a collision of report information occurs at a sub-frame, that one or more pieces of report information can be delayed (e.g., dropped) and transmitted later. For example, if an SR and an ACK collide, the SR can be delayed and transmitted at a later time. If an SR, an ACK and a CQI collide or if a CQI and an SR collide, then one of the SR and the CQI can be dropped. In such scenarios, an ACK can take priority due to ensure proper HARQ operations between a transmitter and a receiver.

In accordance with another aspect, a single carrier constraint imposed on a control channel can be relaxed. A relaxed constraint enables single carrier characteristics to be violated on the control channel. For example, through relaxation of the single carrier constraint, two or more of SR, ACK and CQI can be transmitted in the same sub-frame but on respectively varying frequencies.

Moreover, although not shown, it is to be appreciated that communications apparatus 200 can include memory that retains instructions for identifying collisions of report information in sub-frames, joint coding report information, modulating reference symbols, configuring a device to employ a particular structure, and the like. In addition, the memory can retain instructions related to dropping report information colliding in a particular sub-frame and transmitting dropped information in a later sub-frame. Further, communications apparatus 200 may include a processor that may be utilized in connection with executing instructions (e.g., instructions retained within memory, instructions obtained from a disparate source, ... ).

Figure 3:
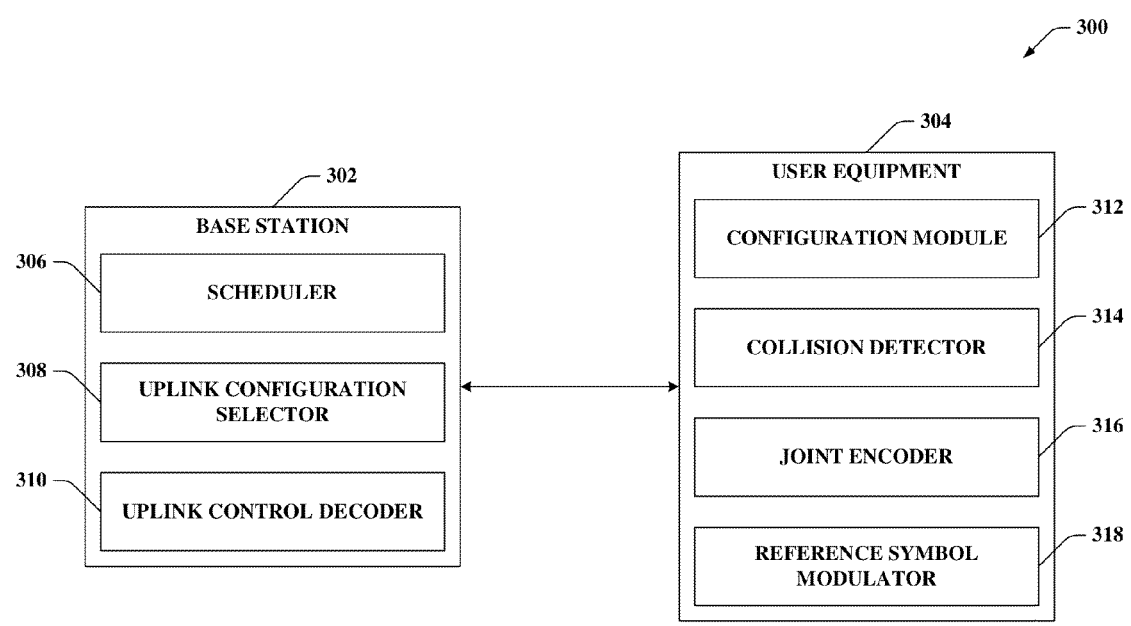
FIG. 3 is an illustration of an example wireless communications system that facilitates simultaneous transmission of report information in a sub-frame.

Now referring to FIG. 3, illustrated is a wireless communications system 300 that facilitates simultaneous transmission of report information in a sub-frame. The system 300 includes a base station 302 that can communicate with user equipment 304 (and/or any number of other, different devices (not shown). The base station 302 can transmit information to the user equipment 304 over a forward link channel or downlink channel; further, base station 302 can receive information from the user equipment 304 over a reverse link channel or uplink channel. Moreover, system 300 can be a MIMO system. Additionally, the system 300 can operate in an OFDMA wireless network (such as 3GPP, 3GPP2, 3GPP LTE, etc., for example). Also, in an example, the components and functionalities shown and described below in the base station 302 can be present in the user equipment 304 and vice versa. The configuration depicted excludes these components for ease of explanation.

Base station 302 can include a scheduler 306 that can provide scheduling of one or more mobile devices on an uplink channel, scheduling of sub-frames in which information from one mobile device is to be transmitted on an uplink or the like. For example, the scheduler 306 can schedule a particular mobile device (e.g., user equipment 304) to transmit report information on different sub-frames. For example, scheduler 306 can configure user equipment 304 to transmit scheduling requests (SR) and channel quality indicators (CQI) on different sub-frames.

In LTE based systems, the uplink employs SC-FDMA. Accordingly, control channel information (e.g., report information) such as scheduling requests (SR), CQI, and acknowledgement messages (ACK) cannot typically be transmitted in a single sub-frame. However, collisions (e.g., need to transmit simultaneously) can arise and a variety of control channel structures can be utilized to achieve simultaneous transmission of control channel information. Base station 302 includes an uplink configuration selector 308 that determines a control channel configuration to employ in collision scenarios. For example, the uplink configuration selector 308 can choose one or more control channel structures described above with reference to FIG. 2 when ACK and SR collide, SR and CQI collide, or ACK, SR and CQI collide. In accordance with an aspect, the configuration selected can be conveyed to user equipment 304 to enable user equipment 304 to report control information. Base station 302 further includes an uplink control decoder 310 that can receive and decipher control information transmitted by user equipment 304. The uplink control decoder 310 can obtain sub-frames of control channel information and extract ACK, SR and/or CQI from the sub-frames in accordance with the control channel configuration chosen by the uplink configuration selector 308.

User equipment 304 includes a configuration module 312 to facilitate configuration of the communications apparatus 200 to employ one of a variety of control channel formats to convey report information. Report information can include data such as, but not limited to, an SR, an ACK, and a CQI. The configuration module 312 can configure user equipment 304 to employ one or more control channel structures or configurations determined by the uplink configuration selector 308. In addition, user equipment 304 can include a collision detector 314 that identifies when control channel information or report information is to be transmitted simultaneously. For instance, the collision detector 314 can ascertain if an SR and ACK, an SR and CQI, or an ACK, SR and CQI, are to be transmitted in a single sub-frame. If a collision occurs, user equipment 304 can employ a joint encoder 316 and a reference symbol modulator 318 to transmit control channel information simultaneously in accordance with the control channel structure selected by the uplink configuration selector 308 and configured by the configuration module 312. Joint encoder 316 can joint code two or more of acknowledgement messages, CQI and/or scheduling requests. Reference symbol modulator 318 can modulate reference symbols (RS) transmitted on the control channel to convey acknowledgement messages or scheduling requests. It will be appreciated that configuration module 312, collision detector 314, joint encoder 316, and reference symbol modulator 318 can be substantially similar to, and perform substantially similar functions as, configuration module 202, collision detector 204, joint encoder 206, and reference symbol modulator 208 described supra with reference to FIG. 2.

Figure 4:
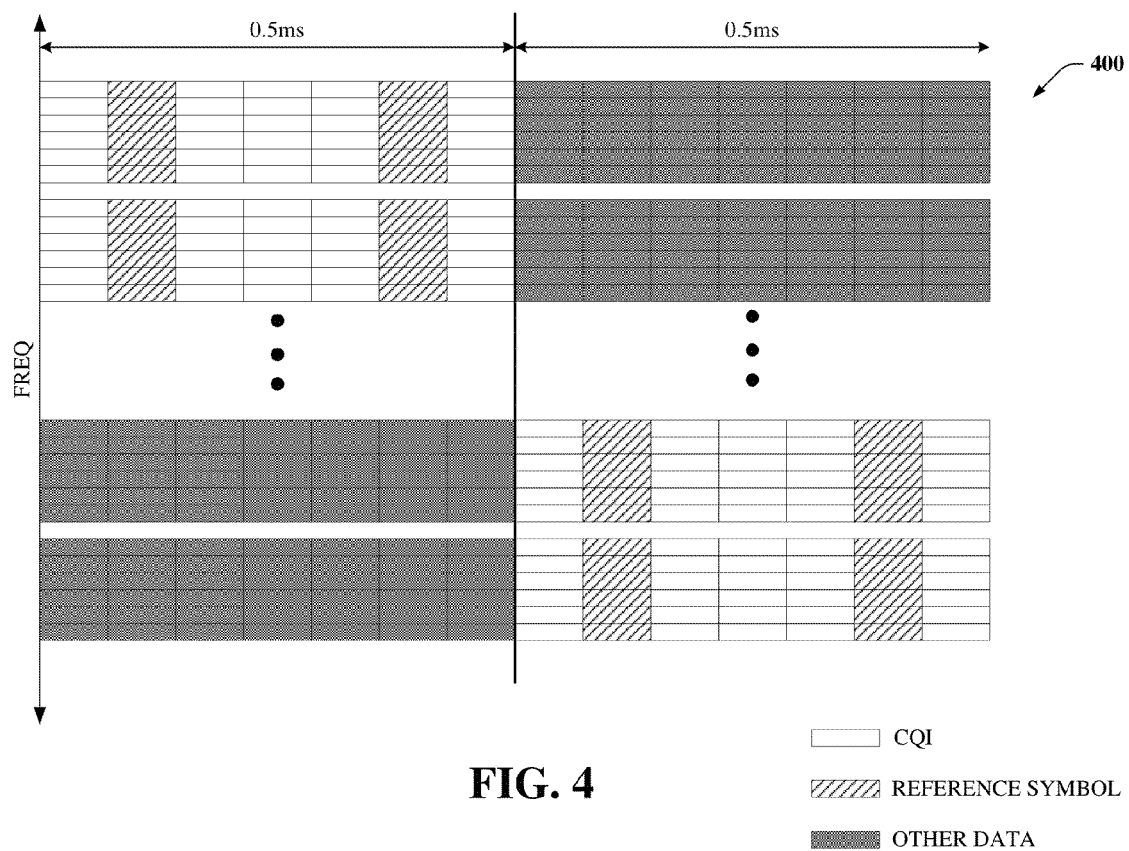
FIG. 4 is an illustration of an example uplink control channel structure and resource allocation in accordance with an aspect of the subject disclosure.

FIG. 4 illustrates an example uplink control channel structure 400 and resource allocation in accordance with an aspect of the subject disclosure. For the purposes of explanation, the examples illustrate a resource block in time and frequency dimensions that is equal in duration to one sub-frame, or two slots of a transmission (e.g., 1 millisecond). Each block along the frequency axis represents a tone. Each block along the time axis represents a symbol. It will be appreciated that FIG. 4 is for illustrative purposes and that the subject matter disclosed herein is not limited to the scope of this example.

Structure 400 depicts a sub-frame with symbol and tone combinations allocated to channel quality indicator (CQI) information, reference symbols (RS), and other data. In accordance with one or more aspects described herein, structure 400 can be adapted to facilitate simultaneous transmission of acknowledgement information, scheduling requests, and CQI information. For example, joint coding can be utilized for scheduling requests, acknowledgement messages, and CQI information. In joint coding, each resource block (e.g., symbol and tone combination) assigned for CQI information can include one or both of acknowledgement messages and scheduling requests embedded therein. According to another aspect, reference symbols can be modulated to convey acknowledgement information or scheduling requests. Resource blocks assigned to reference symbols can be modulated by particular values to indicate either acknowledgement information (e.g., ACK or NACK) or to indicate a scheduling request (e.g., request to be scheduled or not to be scheduled).

Figure 5:
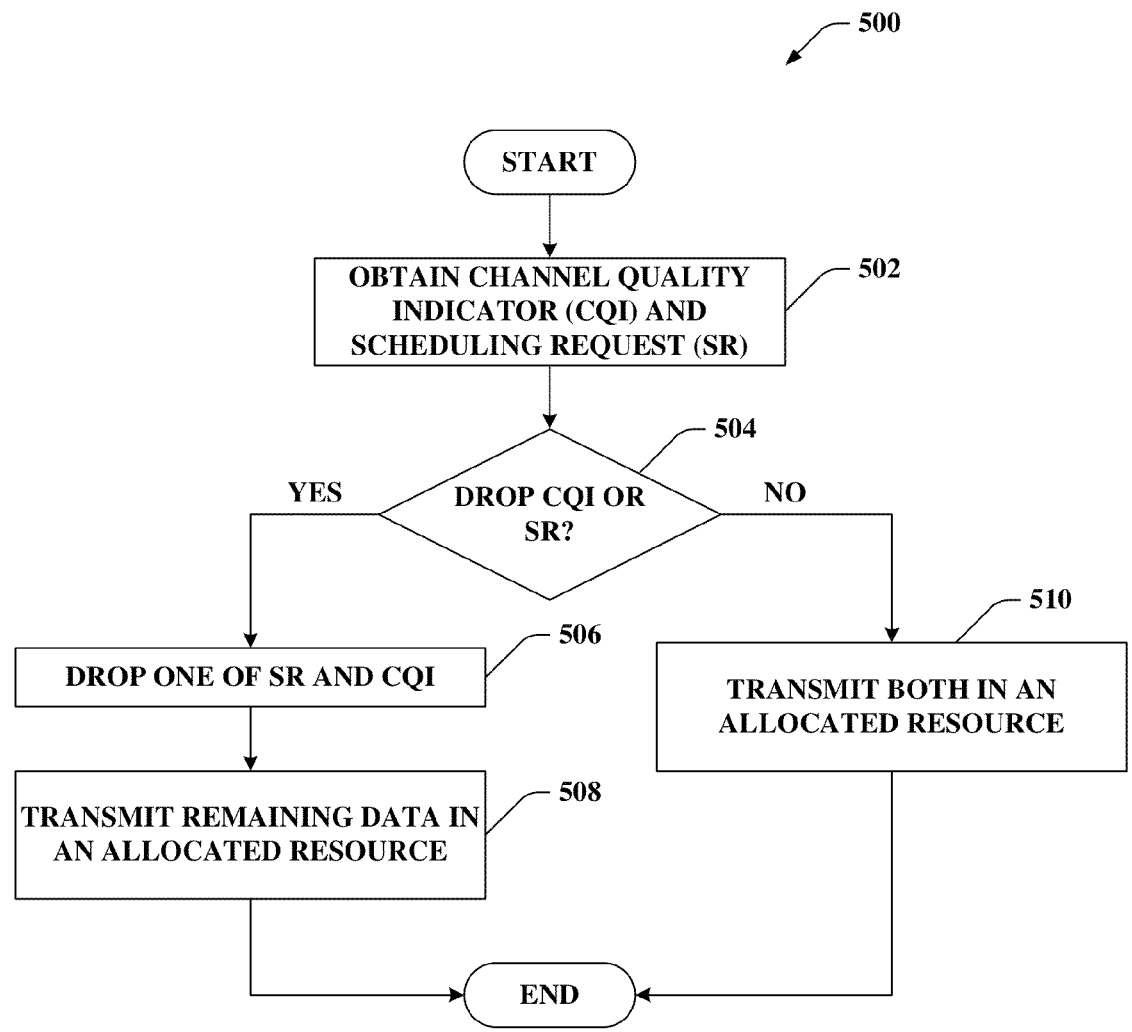
FIG. 5 is an illustration of an example methodology that facilitates simultaneous transmission of channel quality indicators and scheduling requests.
Figure 6:
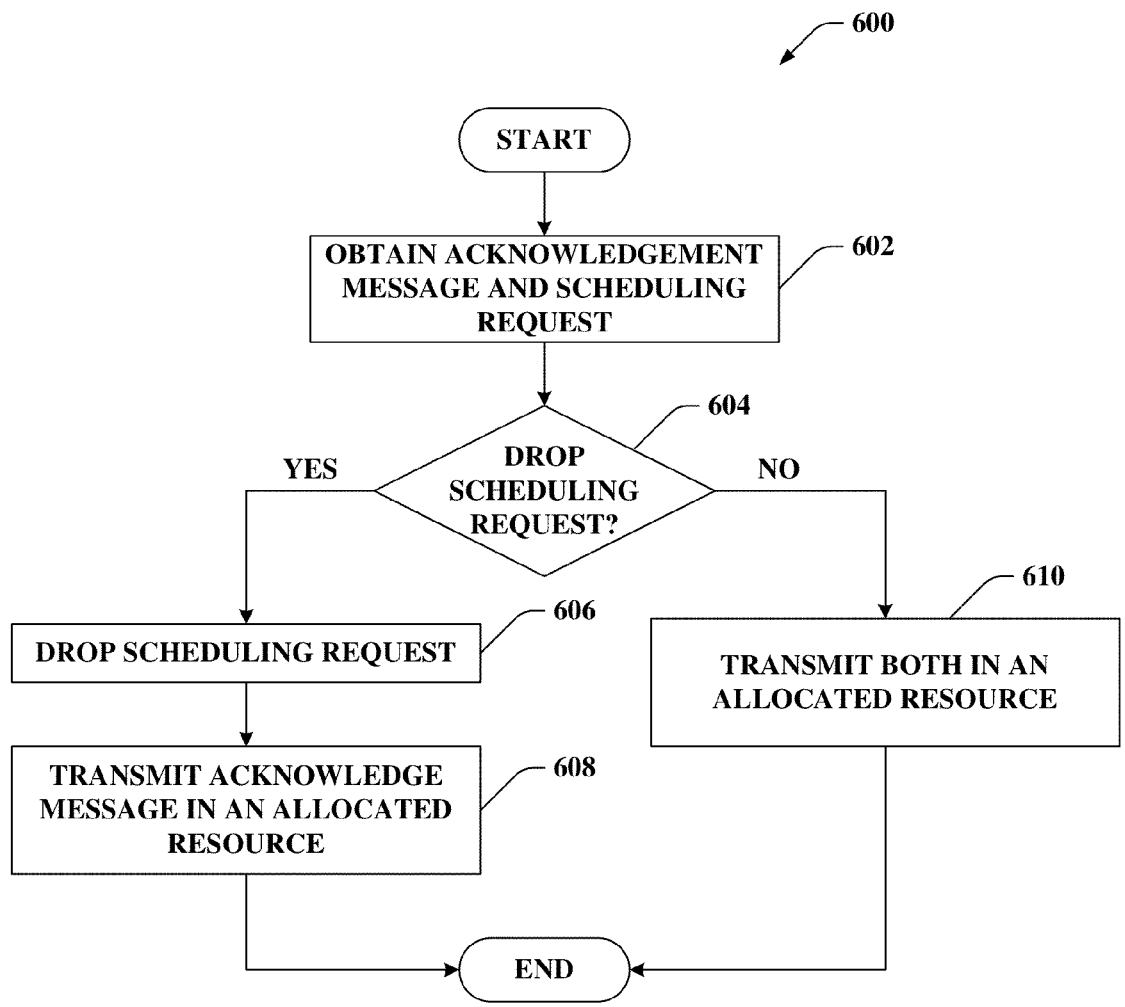
FIG. 6 is an illustration of an example methodology that facilitates simultaneous transmission of acknowledgement messages and scheduling requests.
Figure 7:
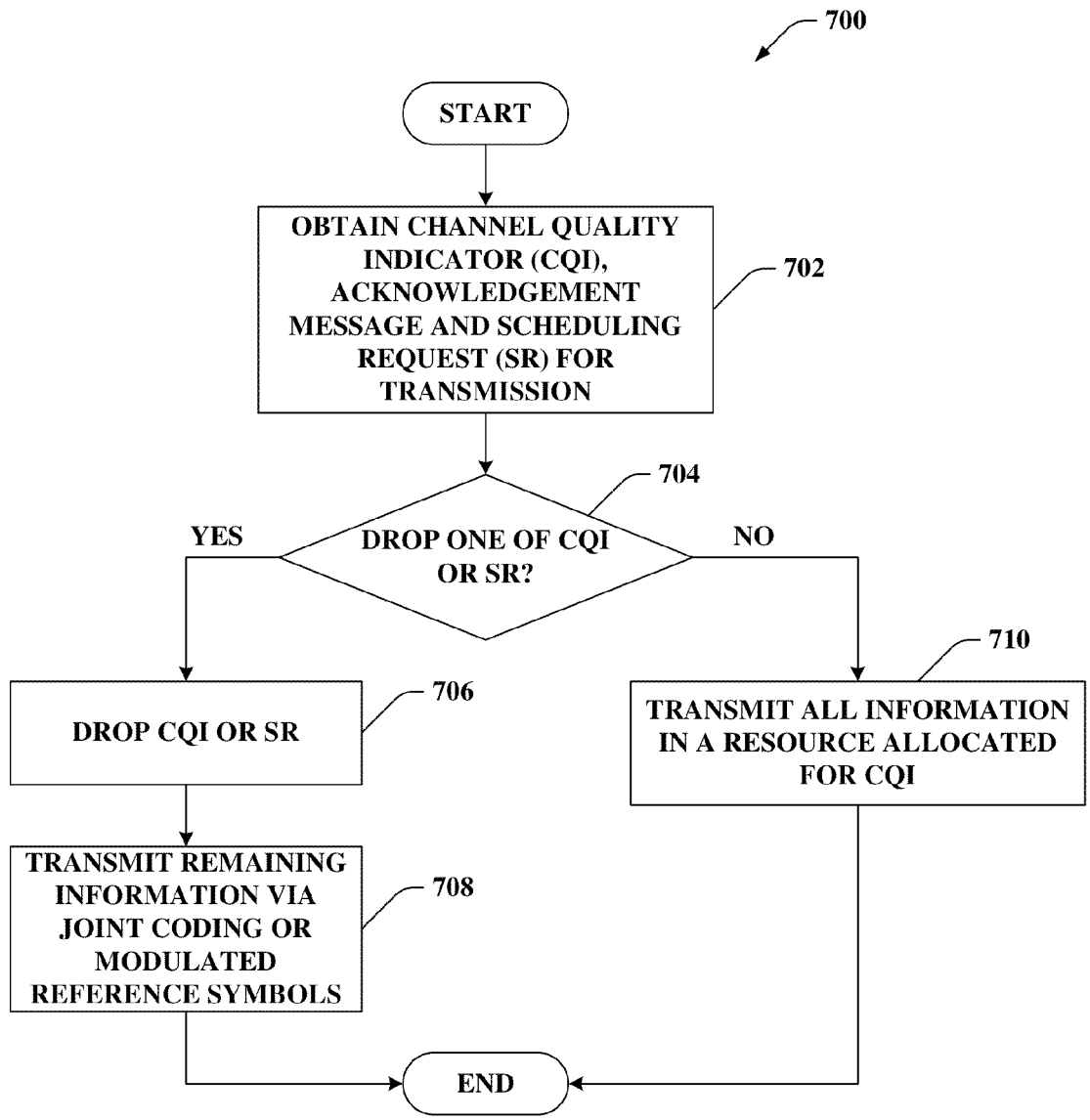
FIG. 7 an illustration of an example methodology that facilitates simultaneous transmission of acknowledgement messages, channel quality indicators and scheduling requests.

Referring to FIGS. 5-7, methodologies relating to simultaneously transmitting control channel or report information are described. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 5, illustrated is a method 500 that facilitates simultaneous transmission of channel quality indicators and scheduling requests. Method 500 can be employed by, for example, a mobile device to transmit control channel information in a single sub-frame of an uplink control channel to maintain a single carrier waveform. At block 502, a channel quality indicator and a scheduling request are obtained. The channel quality indicator (CQI) and scheduling request (SR) can be scheduled to transmit in a single sub-frame. At block 504, a determination is made whether or not to drop the CQI or the SR from the transmission. If a determination is made to drop either the CQI or the SR, method 500 proceeds to block 506 where one of the SR or CQI is dropped from the transmission. At block 508, remaining data are transmitted in the sub-frame at an assigned slot with allocated resources. If a determination is made, at block 504, not to drop the SR or CQI, method 500 proceeds to block 510 where both the SR and CQI are transmitted in an allocated resource. For example, the SR and CQI can be jointly coded and transmitted in a resource allocated for channel quality transmission. In addition, reference symbols also transmitted in the single sub-frame can be modulated to convey the SR.

Referring to FIG. 6, illustrated is a method 600 that facilitates simultaneous transmission of acknowledgement messages and scheduling requests. Method 600 can be employed by, for example, a mobile device to transmit control channel information in a single sub-frame of an uplink control channel to maintain a single carrier waveform. At block 602, an acknowledgement message (e.g., ACK or NACK) and a scheduling request are obtained. The acknowledgement message and scheduling request can be scheduled to transmit in a single sub-frame. At block 604, a determination is made whether or not to drop the scheduling request from the transmission. For efficient operation of HARQ processes, acknowledge messages take priority over other control information. If a determination is made to drop the scheduling request, method 600 proceeds to block 606 where the scheduling request is dropped from the transmission. At block 608, the acknowledge message is transmitted in the sub-frame utilizing resources assigned for ACK or NACK indicators. If a determination is made, at block 604, not to drop the scheduling request, method 600 proceed to block 610 where both the scheduling request and acknowledge message are transmitted in an allocated resource. For example, a modulation scheme such as 8PSK (phase shift keying) can be employed to transmit both the acknowledgement message and the scheduling request.

Turning to FIG. 7, a method 700 is illustrated that facilitates simultaneous transmission of acknowledgement messages, channel quality indicators and scheduling requests. Method 700 can be employed by, for example, a mobile device to transmit control channel information in a single sub-frame of an uplink control channel to maintain a single carrier waveform. Method 700 can commence at block 702 where a channel quality indicator (CQI), an acknowledgement message, and a scheduling request (SR) can be obtained for transmission on a single sub-frame. At block 704, a decision can be made as to whether or not to drop (e.g., not transmit) one of the CQI and the SR. If yes, method 700 proceeds to block 706, where one of the CQI and SR is flagged for transmission at a later time (e.g., a subsequent sub-frame). At block 708, the remaining information (e.g., either the acknowledgement message and the CQI or the acknowledgement message and the SR) can be transmitted via joint coding or modulating reference symbols. For example, the acknowledgement message and the CQI can be jointly coded and transmitted on resources assigned to the CQI. In addition, reference symbols in the sub-frame can be modulated to indicate the acknowledgement message. Moreover, if the CQI is dropped, the SR and acknowledgement message can be transmitted simultaneously as described supra with reference to FIGS. 2 and 6.

If a decision, at block 704, is made not to drop either the CQI or SR, method 700 proceeds to block 710, where the CQI, SR and acknowledgement message can be transmitted simultaneously in a resource allocated for the CQI. In one example, the SR, acknowledgement message, and CQI a can be jointly coded. According to another example, the SR and the CQI can be jointly coded and reference symbols can be modulated to indicate the acknowledgement message. In addition, the acknowledgement message and CQI can be jointly coded and reference symbols can be modulated to indicate the SR.

It will be appreciated that, in accordance with one or more aspects described herein, inferences can be made regarding detecting collisions (e.g., where two or more control information types are scheduled on a single sub-frame), dropping or delaying control information types to remove collisions, selecting a control channel structure to simultaneously transmit control information, and the like. As used herein, the term to "infer" or "inference" refers generally to the process of reasoning about or inferring states of the system, environment, and/or user from a set of observations captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. New events or actions are thus constructed from a set of observations and/or stored event data, regardless of whether the observations and events represented by the data are correlated in close temporal proximity, and whether the observations and data come from one or several sources.

Figure 8:
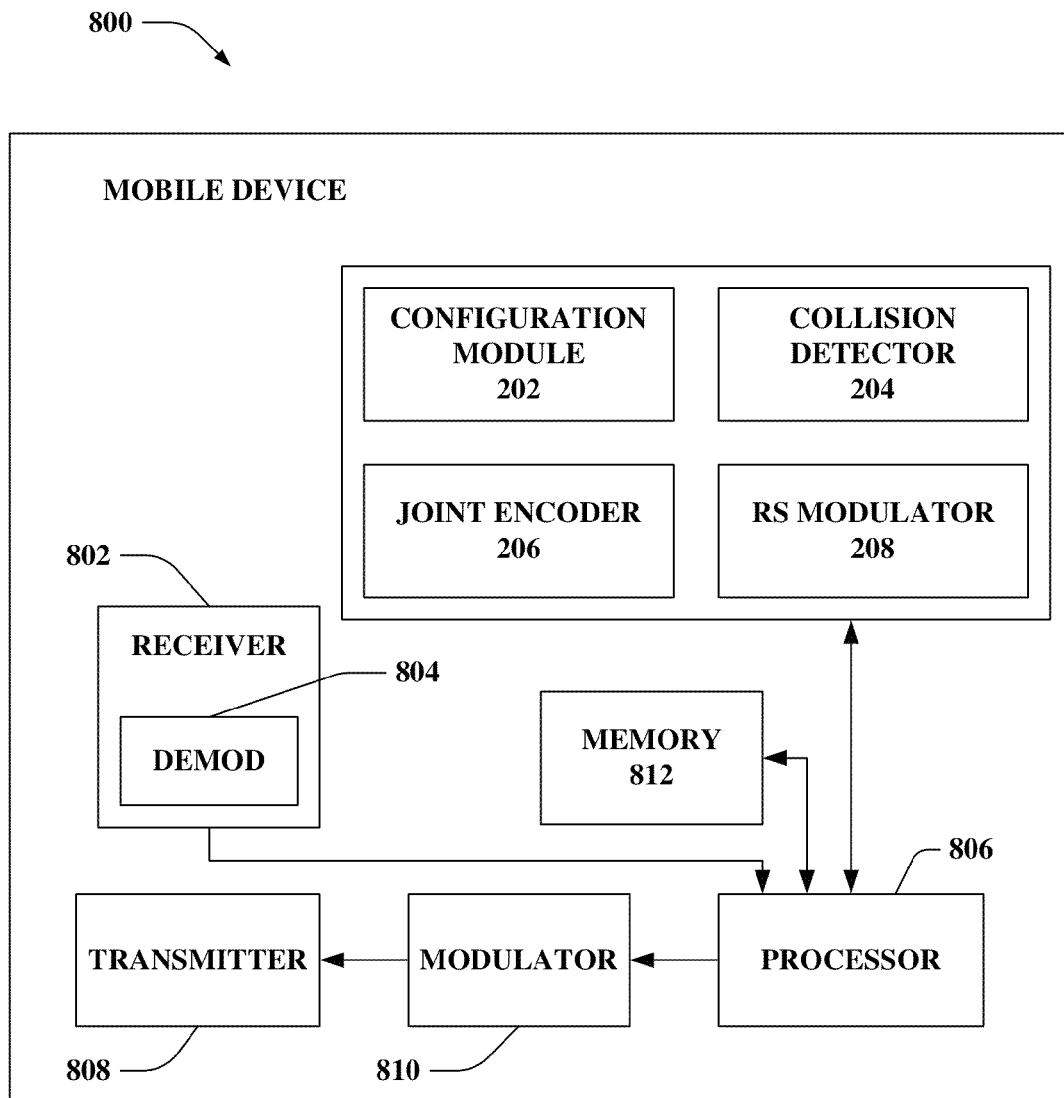
FIG. 8 is an illustration of an example system that facilitates transmission of a variety of report information in a sub-frame.

FIG. 8 is an illustration of a mobile device 800 that can facilitate communications associated with a base station (e.g., base station 102) in a wireless communication system in accordance with an aspect of the disclosed subject matter. It will be appreciated that the mobile device 800 can be the same or similar as, and/or can comprise the same or similar functionality as, mobile device 116, user equipment 304, or communications apparatus 200, such as more described herein, for example, with regard to system 100, system 200, system 300, methodology 500, methodology 600, and methodology 700.

Mobile device 800 can comprise a receiver 802 that receives a signal from, for instance, a receive antenna (not shown), and performs typical actions (e.g., filters, amplifies, downconverts, etc.) on the received signal, including digitizing the conditioned signal to obtain samples. Receiver 802 can be, for example, an MMSE receiver, and can include a demodulator 804 that can demodulate received symbols and provide the demodulated symbols to a processor 806 for channel estimation. Processor 806 can be a processor dedicated to analyzing information received by receiver 802 and/or generating information for transmission by a transmitter 808, a processor that controls one or more components of mobile device 800, and/or a processor that both analyzes information received by receiver 802, generates information for transmission by transmitter 808, and controls one or more components of mobile device 800. Mobile device 800 can also comprise a modulator 810 that can work in conjunction with the transmitter 808 to facilitate transmitting signals (e.g., data) to, for instance, a base station (e.g., 102, 302), another mobile device (e.g., 122), etc.

In one aspect, the processor 806 can be coupled with a configuration module 202 that configures mobile device 800 to employ one or more control channel structures selected by a base station 102 or other network entity. In another aspect, the processor 806 can be coupled to a collision detector 204 that identifies collisions such as when two or more of a scheduling request, an acknowledgement message, or a channel quality indicator are to be transmitted in a single sub-frame. The processor 806 also can be connected to a joint encoder 206 that facilitates joint coding of two or more of acknowledgement messages, CQIs, and/or scheduling requests in a single sub-frame. The processor 806 also can be coupled to a reference symbol modulator 208 that facilitates modulating reference symbols transmitted in the single sub-frame on the control channel. For example, reference symbols can be modulated to indicate scheduling requests or acknowledgement messages.

Mobile device 800 can additionally comprise memory 812 that is operatively coupled to processor 806, and can store data to be transmitted, received data, information related to available channels, data associated with analyzed signal and/or interference strength, information related to an assigned channel, power, rate, or the like, and any other suitable information useful for estimating a channel and communicating via the channel. Memory 812 can additionally store protocols and/or algorithms associated with estimating and/or utilizing a channel (e.g., performance based, capacity based, etc.). Further, memory 812 can retain prioritized bit rates, maximum bit rates, queue sizes, etc., related to one or more bearers serviced by the mobile device 800.

It will be appreciated that the data store (e.g., memory 812) described herein can be volatile memory, nonvolatile memory, and can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 812 of the systems and methods disclosed herein is intended to include, without being limited to, these and any other suitable types of memory.

It will be appreciated and understood that the configuration module 202, collision detector 204, joint encoded 206, reference symbol modulator 208, and memory 812 can each be the same or similar as, or can comprise the same or similar functionality as, respective components such as are more fully described herein, for example, with regard to system 200 and system 300. It will be further appreciated and understood that the configuration module 202, collision detector 204, joint encoded 206, reference symbol modulator 208, and memory 812 each can be a stand-alone unit (as depicted), can be included within the processor 806, can be incorporated within another component, and virtually any suitable combination thereof, as desired.

Figure 9:
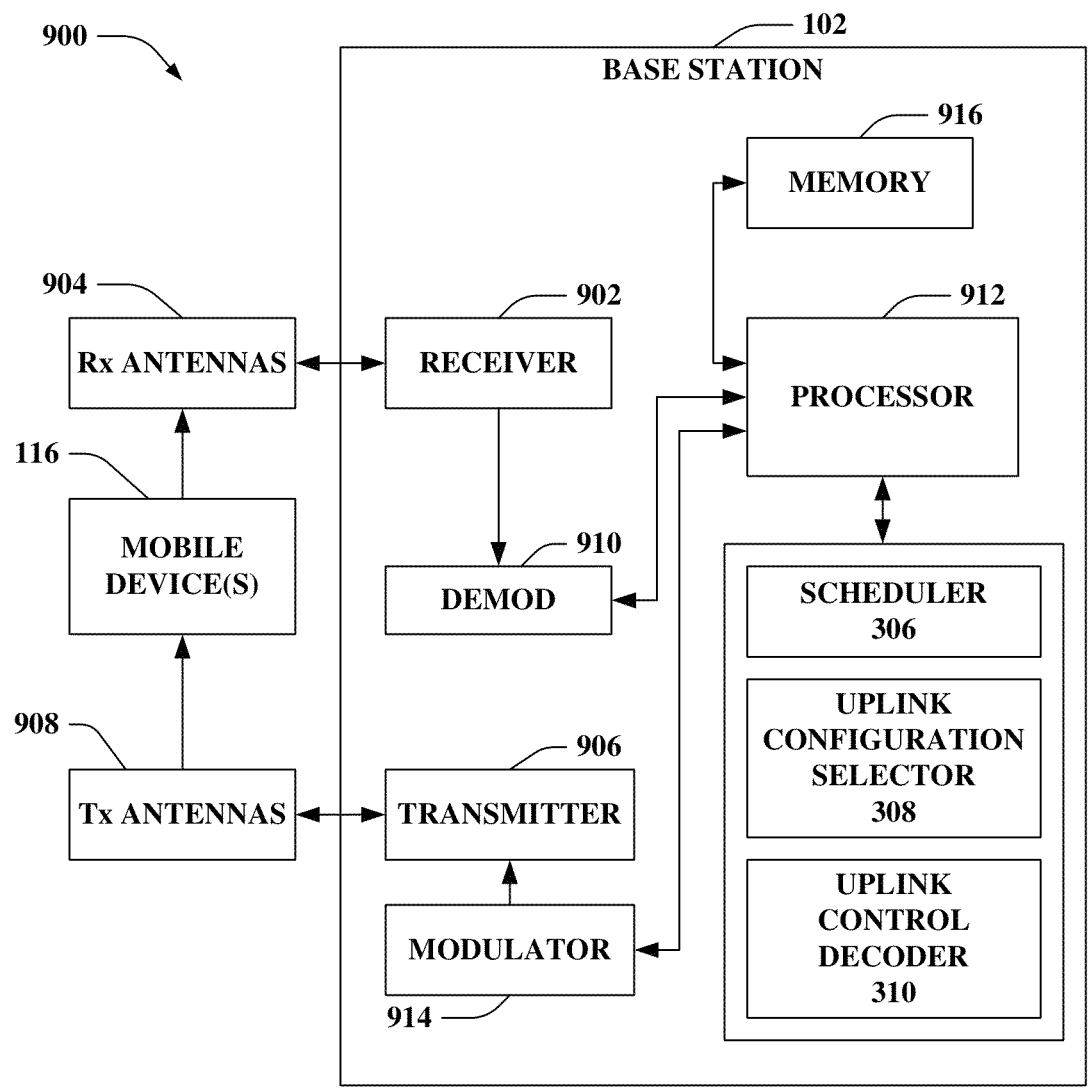
FIG. 9 is an illustration of an example system that facilitates configuration and decoding of transmission that include simultaneous reports of a variety of information.

FIG. 9 is an illustration of a system 900 that can facilitate communications associated with a mobile device in a wireless communication system in accordance with an aspect of the disclosed subject matter. System 900 can comprise a base station 102 (e.g., access point, . . . ). The base station 102 can include a receiver 902 that can receive signal(s) from one or more mobile devices 116 through a plurality of receive antennas 904, and a transmitter 906 that can transmit signals (e.g., data) to the one or more mobile devices 116 through a transmit antenna 908. Receiver 902 can receive information from receive antennas 904, and can be operatively coupled with a demodulator 910 that can demodulate received information. Demodulated symbols can be analyzed by a processor 912 that can be a processor dedicated to analyzing information received by receiver 902 and/or generating information for transmission by a transmitter 906, a processor that controls one or more components of base station 102, and/or a processor that both analyzes information received by receiver 902, generates information for transmission by transmitter 906, and controls one or more components of base station 102. The base station 102 can also comprise a modulator 914 that can work in conjunction with the transmitter 906 to facilitate transmitting signals (e.g., data) to, for instance, a mobile device 116, another device, etc.

Processor 912 can be coupled with a scheduler 306 that can provide scheduling of one or more mobile devices on an uplink channel, scheduling of sub-frames in which information from a mobile device is to be transmitted on an uplink or the like. In another aspect, the processor 912 can be coupled to an uplink configuration selector 308 that determines a control channel configuration to employ in collision scenarios. The processor 912 also can be coupled to an uplink control decoder 310 that can receive and decipher control information transmitted by mobile devices 116.

Base station 102 can additionally comprise memory 916 that is operatively coupled to processor 912, and can store data to be transmitted, received data, information related to available channels, data associated with an analyzed signal and/or interference strength, information related to an assigned channel, power, rate, or the like, and any other suitable information useful for estimating a channel and communicating via the channel. Memory 916 can additionally store protocols and/or algorithms associated with estimating and/or utilizing a channel (e.g., performance based, capacity based, etc.).

It will be appreciated that the memory 916 described herein can be volatile memory, nonvolatile memory, and can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 916 of the systems and methods disclosed herein is intended to comprise, without being limited to, these and any other suitable types of memory.

It will be appreciated and understood that the scheduler 306, uplink configuration selector 308, uplink control decoder 310, and memory 916 can each be the same or similar as, or can comprise the same or similar functionality as, respective components such as are more fully described herein, for example, with regard to system 300. It will be further appreciated and understood that the scheduler 306, uplink configuration selector 308, uplink control decoder 310, and memory 916 each can be a stand-alone unit (as depicted), can be included within the processor 912, can be incorporated within another component, and virtually any suitable combination thereof, as desired.

Figure 10:
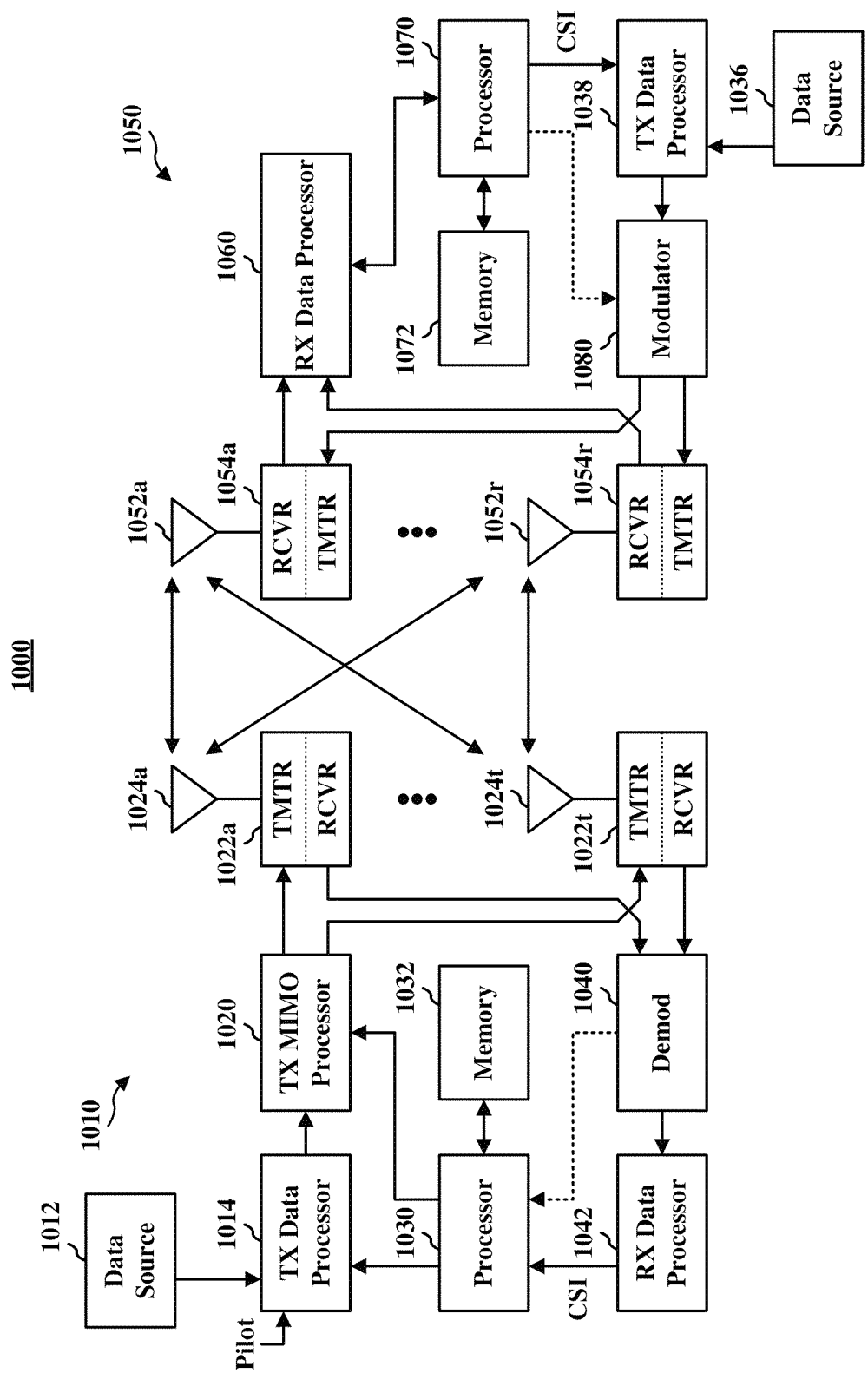
FIG. 10 is an illustration of an example wireless network environment that can be employed in conjunction with the various systems and methods described herein.

FIG. 10 shows an example wireless communication system 1000. The wireless communication system 1000 depicts one base station 1010 and one mobile device 1050 for sake of brevity. However, it is to be appreciated that system 1000 can include more than one base station and/or more than one mobile device, wherein additional base stations and/or mobile devices can be substantially similar or different from example base station 1010 and mobile device 1050 described below. In addition, it is to be appreciated that base station 1010 and/or mobile device 1050 can employ the systems (FIGS. 1,2, 3 and 8-9), channel structures (FIG. 4) and/or methods (FIGS. 5-7) described herein to facilitate wireless communication there between.

At base station 1010, traffic data for a number of data streams is provided from a data source 1012 to a transmit (TX) data processor 1014. According to an example, each data stream can be transmitted over a respective antenna. TX data processor 1014 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1050 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1030.

The modulation symbols for the data streams can be provided to a TX MIMO processor 1020, which can further process the modulation symbols (e.g., for OFDM). TX MIMO processor 1020 then provides $N_T$ modulation symbol streams to $N_T$ transmitters (TMTR) 1022a through 1022t. In various embodiments, TX MIMO processor 1020 applies beamforming weights to the symbols of the data streams and to the antenna from which the symbol is being transmitted.

Each transmitter 1022 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1022a through 1022t are transmitted from $N_T$ antennas 1024a through 1024t, respectively.

At mobile device 1050, the transmitted modulated signals are received by $N_R$ antennas 1052a through 1052r and the received signal from each antenna 1052 is provided to a respective receiver (RCVR) 1054a through 1054r. Each receiver 1054 conditions (e.g., filters, amplifies, and downconverts) a respective signal, digitizes the conditioned signal to provide samples, and further processes the samples to provide a corresponding "received" symbol stream.

An RX data processor 1060 can receive and process the $N_R$ received symbol streams from $N_R$ receivers 1054 based on a particular receiver processing technique to provide $N_T$ "detected" symbol streams. RX data processor 1060 can demodulate, deinterleave, and decode each detected symbol stream to recover the traffic data for the data stream. The processing by RX data processor 1060 is complementary to that performed by TX MIMO processor 1020 and TX data processor 1014 at base station 1010.

A processor 1070 can periodically determine which precoding matrix to utilize as discussed above. Further, processor 1070 can formulate a reverse link message comprising a matrix index portion and a rank value portion.

The reverse link message can comprise various types of information regarding the communication link and/or the received data stream. The reverse link message can be processed by a TX data processor 1038, which also receives traffic data for a number of data streams from a data source 1036, modulated by a modulator 1080, conditioned by transmitters 1054a through 1054r, and transmitted back to base station 1010.

At base station 1010, the modulated signals from mobile device 1050 are received by antennas 1024, conditioned by receivers 1022, demodulated by a demodulator 1040, and processed by a RX data processor 1042 to extract the reverse link message transmitted by mobile device 1050. Further, processor 1030 can process the extracted message to determine which precoding matrix to use for determining the beamforming weights.

Processors 1030 and 1070 can direct (e.g., control, coordinate, manage, etc.) operation at base station 1010 and mobile device 1050, respectively. Respective processors 1030 and 1070 can be associated with memory 1032 and 1072 that store program codes and data. Processors 1030 and 1070 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 11:
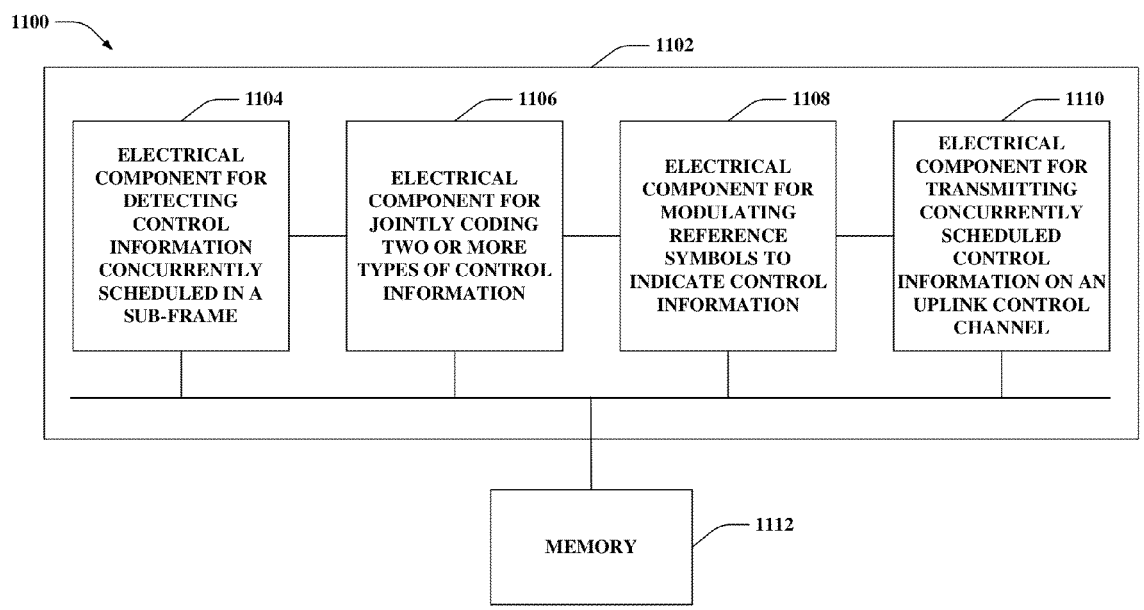
FIG. 11 is an illustration of an example system that enables simultaneous transmission of a plurality of control information in a single sub-frame.

Referring to FIG. 11, illustrated is a system 1100 that enables simultaneous transmission of a plurality of instances of control information in a single sub-frame. For example, system 1100 can reside at least partially within a base station 102, mobile device 116, etc. It will be appreciated that system 1100 is represented as including functional blocks, which can represent functions implemented by a processor, with software, or a combination thereof (e.g., firmware). System 1100 includes a logical grouping 1102 of electrical components that can act in conjunction. For instance, logical grouping 1102 can include an electrical component for detecting control information concurrently scheduled in a sub-frame 1104. Accordingly, for example, a scheduling request and an acknowledgement message can be concurrently scheduled. In addition, a scheduling request and a channel quality indicator can be concurrently scheduled. Moreover, a channel quality indicator, an acknowledgement message and a scheduling request can coexist in a sub-frame. Further, logical grouping 1102 can comprise an electrical component for jointly coding two or more types of control information 1106. For example, a scheduling request and a channel quality indicator can be jointly coded, and an acknowledgement message, a channel quality indicator and a scheduling request can be jointly coded. Logical grouping 1102 can include an electrical component for modulating reference symbols to indicate control information 1108. Reference symbols can be modulated to indicate a scheduling request and/or an acknowledgement message. Logical grouping 1102 can also include an electrical component for transmitting concurrently scheduled control information on an uplink control channel. Additionally, system 1100 can include a memory 1112 that retains instructions for executing functions associated with electrical components 1104, 1106, 1108 and 1110. While shown as being external to memory 1112, it will be understood that one or more of electrical components 1104, 1106, 1108 and 1110 can exist within memory 1112.

Figure 12:
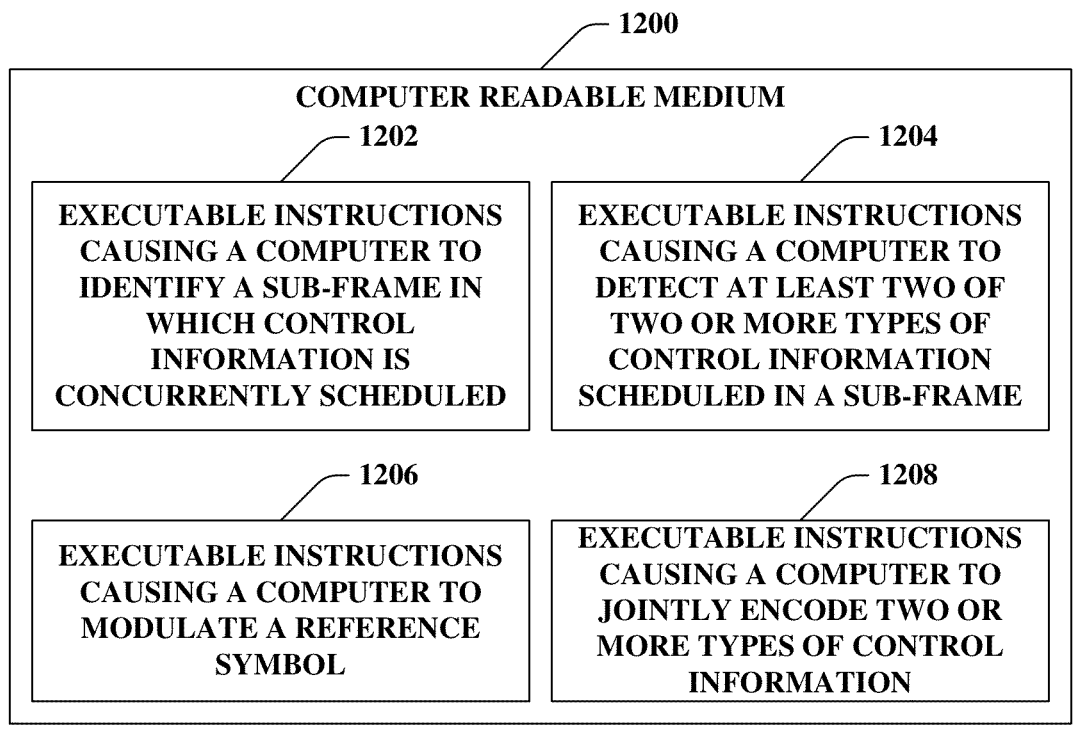
FIG. 12 is an illustration of an example computer-readable medium encoded with executable instructions for causing at least one computer to perform one or more aspects of the subject disclosure.

FIG. 12 depicts a computer-readable medium 1200 encoded with executable instructions causing at least one computer to perform one or more aspects of the subject disclosure. The computer-readable medium 1200 can include but is not limited to a magnetic storage device (e.g., hard disk, floppy disk, magnetic strip, etc.), an optical disk (e.g., compact disk (CD), digital versatile disk (DVD), etc.), a smart card, and a flash memory device (e.g., EPROM, card, stick, key drive, etc.). In addition, the at least one computer can include a mobile device (e.g., mobile device 116) and a base station (e.g., base station 102). The computer-readable medium 1200 can include executable instructions causing a computer to identify a sub-frame in which control information is concurrently scheduled 1202. The control information can include acknowledgement messages, channel quality indicators, and scheduling requests. The computer-readable medium 1200 can also include executable instructions causing a computer to detect at least two of two or more types of control information scheduled in a sub-frame 1204. For example, the executable instructions 1204 can detect one of: a scheduling request and an acknowledgement message; a channel quality indicator and a scheduling request; and a scheduling request, an acknowledgement message, and a channel quality indicator. Further, the computer-readable medium 1200 can be encoded with executable instructions causing a computer to modulate a reference symbol 1206. The reference symbol can be modulated to indicate a scheduling request or an acknowledgement message, for example. The computer-readable medium 1200 can also be encoded with executable instructions causing a computer to jointly encode two or more types of control information 1208.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of reporting uplink control information in a multiple-access wireless communication system, the method comprising:
    identifying a collision for reporting two or more types of control information in a sub-frame;
    selecting, based on the two or more types of control information associated with the identified collision, between dropping one of the types of control information or transmitting the two or more types of control information; and
    transmitting at least one control information transmission comprising at least one of the two or more types of control information in the sub-frame.

2. The method of claim 1, wherein:
    identifying the collision comprises detecting a scheduling request and an acknowledgement message scheduled in the sub-frame; and
    transmitting the at least one control information transmission comprises transmitting the scheduling request and the acknowledgement message at resources assigned for the scheduling request in the sub-frame.

3. The method of claim 1, wherein identifying the collision comprises detecting a channel quality indicator and an acknowledgment message scheduled in the sub-frame, the method further comprising:
dropping the channel quality indicator for the at least one control information transmission in the sub-frame.

4. The method of claim 3, further comprising:
re-scheduling the channel quality indicator to a subsequent sub-frame.

5. The method of claim 1, wherein identifying the collision comprises detecting a channel quality indicator and an acknowledgment message scheduled in the sub-frame, the method further comprising:
jointly coding the channel quality indicator and the acknowledgment message in the at least one control information transmission.

6. The method of claim 1, wherein identifying the collision comprises detecting a channel quality indicator and an acknowledgment message scheduled in the sub-frame, the method further comprising:
coding the channel quality indicator in a control channel for transmission in the at least one control information transmission in the sub-frame; and
modulating a reference signal with the acknowledgement message for the at least one control information transmission.

7. The method of claim 1, wherein identifying the collision comprises detecting an acknowledgement message, a scheduling request and a channel quality indicator scheduled in the sub-frame, the method further comprising:
jointly coding at least two of the acknowledgement message, the scheduling request and the channel quality indicator in the at least one control information transmission.

8. The method of claim 1, wherein identifying the collision comprises detecting an acknowledgement message, a scheduling request and a channel quality indicator scheduled in the sub-frame, the method further comprising:
modulating a reference signal with at least one of the scheduling request or the acknowledgement message for the at least one control information transmission.

9. The method of claim 1, wherein transmitting the at least one control information transmission comprises transmitting at least two of the two or more types of control information on respectively varying frequencies in the sub-frame.

10. An apparatus for reporting uplink control information in a multiple-access wireless communication system, the apparatus comprising at least one processor configured to:
identify a collision for reporting two or more types of control information in a sub-frame;
select, based on the two or more types of control information associated with the identified collision, between dropping one of the types of control information or transmitting the two or more types of control information; and
transmit at least one control information transmission comprising at least one of the two or more types of control information in the sub-frame.

11. The apparatus of claim 10, wherein the at least one processor is further configured to:
detect a scheduling request and an acknowledgement message scheduled in the sub-frame; and
transmit the scheduling request and the acknowledgement message at resources assigned for the scheduling request in the sub-frame.

12. The apparatus of claim 10, wherein the at least one processor is further configured to:
detect a channel quality indicator and an acknowledgment message scheduled in the sub-frame; and
drop the channel quality indicator for the at least one control information transmission in the sub-frame.

13. The apparatus of claim 10, wherein the at least one processor is further configured to:
detect a channel quality indicator and an acknowledgment message scheduled in the sub-frame; and
jointly code the channel quality indicator and the acknowledgment message in the at least one control information transmission.

14. The apparatus of claim 10, wherein the at least one processor is further configured to:
detect a channel quality indicator and an acknowledgment message scheduled in the sub-frame;
code the channel quality indicator in a control channel for transmission in the at least one control information transmission in the sub-frame; and
modulate a reference signal with the acknowledgement message for the at least one control information transmission.

15. The apparatus of claim 10, wherein the at least one processor is further configured to:
detect an acknowledgement message, a scheduling request and a channel quality indicator scheduled in the sub-frame; and
jointly code at least two of the acknowledgement message, the scheduling request and the channel quality indicator in the at least one control information transmission.

16. An apparatus for reporting uplink control information in a multiple-access wireless communication system, comprising:
means for identifying a collision for reporting two or more types of control information in a sub-frame;
means for selecting, based on the two or more types of control information associated with the identified collision, between dropping one of the types of control information or transmitting the two or more types of control information; and
means for transmitting at least one control information transmission comprising at least one of the two or more types of control information in the sub-frame.

17. The apparatus of claim 16, wherein the means for identifying the collision detects a scheduling request and an acknowledgement message scheduled in the sub-frame, and the means for transmitting the at least one control information transmission transmits the scheduling request and the acknowledgement message at resources assigned for the scheduling request in the sub-frame.

18. The apparatus of claim 16, wherein the means for identifying the collision detects a channel quality indicator and an acknowledgment message scheduled in the sub-frame, further comprising:
means for dropping the channel quality indicator for the at least one control information transmission in the sub-frame.

19. The apparatus of claim 16, wherein the means for identifying the collision detects a channel quality indicator and an acknowledgment message scheduled in the sub-frame, further comprising:
means for jointly coding the channel quality indicator and the acknowledgment message in the at least one control information transmission.

20. The apparatus of claim 16, wherein the means for identifying the collision detects a channel quality indicator and an acknowledgment message scheduled in the sub-frame, further comprising:
- means for coding the channel quality indicator in a control channel for transmission in the at least one control information transmission in the sub-frame; and
- means for modulating a reference signal with the acknowledgement message for the at least one control information transmission.

21. The apparatus of claim 16, wherein the means for identifying the collision detects an acknowledgement message, a scheduling request and a channel quality indicator scheduled in the sub-frame, further comprising:
- means for jointly coding at least two of the acknowledgement message, the scheduling request and the channel quality indicator in the at least one control information transmission.

22. A non-transitory computer-readable medium storing computer-executable instructions that, when executed by a computer, cause the computer to:
- identify a collision for reporting two or more types of control information in a sub-frame;
- select, based on the two or more types of control information associated with the identified collision, between dropping one of the types of control information or transmitting the two or more types of control information; and
- transmit at least one control information transmission comprising at least one of the two or more types of control information in the sub-frame.

* * * * *